July 2, 1935.  P. J. WIEZEVICH  2,007,117

SECTIONAL FRACTIONATING COLUMN

Filed May 27, 1932

INVENTOR.

Peter J. Wiezevich

BY

W. E. Currie ATTORNEYS.

Patented July 2, 1935

2,007,117

UNITED STATES PATENT OFFICE 2,007,117

SECTIONAL FRACTIONATING COLUMN

Peter J. Wiezevich, Elizabeth, N. J., assignor to Standard Oil Development Company, a corporation of Delaware Application May 27, 1932, Serial No. 613,871

4 Claims. (Cl. 196—133)

This invention relates to improvements in fractionating columns adapted for use in separating hydrocarbon vapors into fractions of different boiling points.

The invention will be fully understood from the following description taken in connection with the accompanying drawing in which latter—

Figure 1:
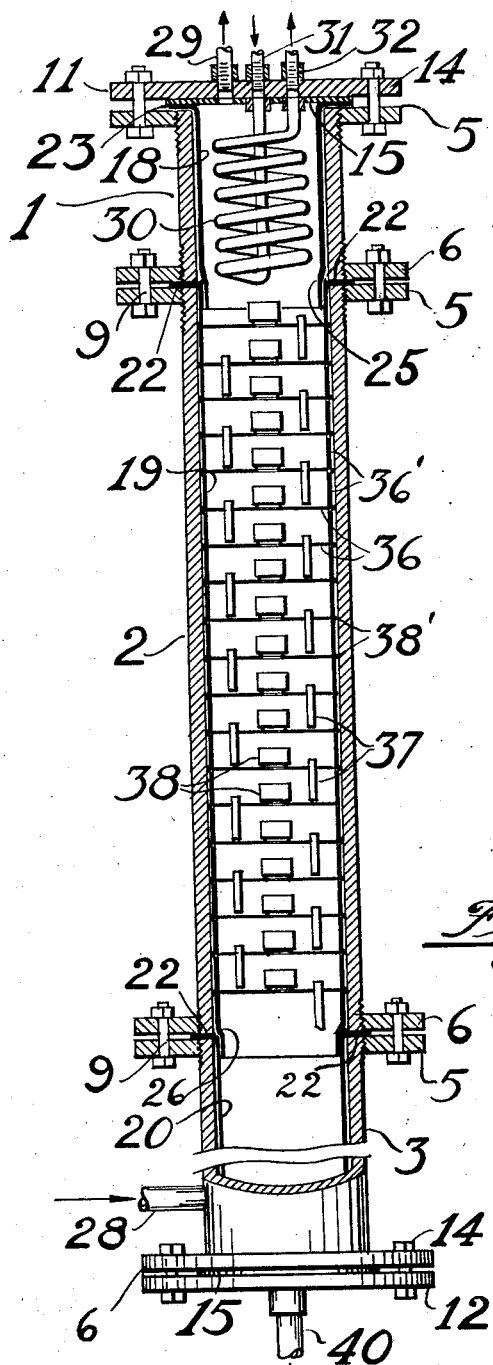
Fig. 1 is a longitudinal sectional view through a sectional fractionating column.
Figure 2:
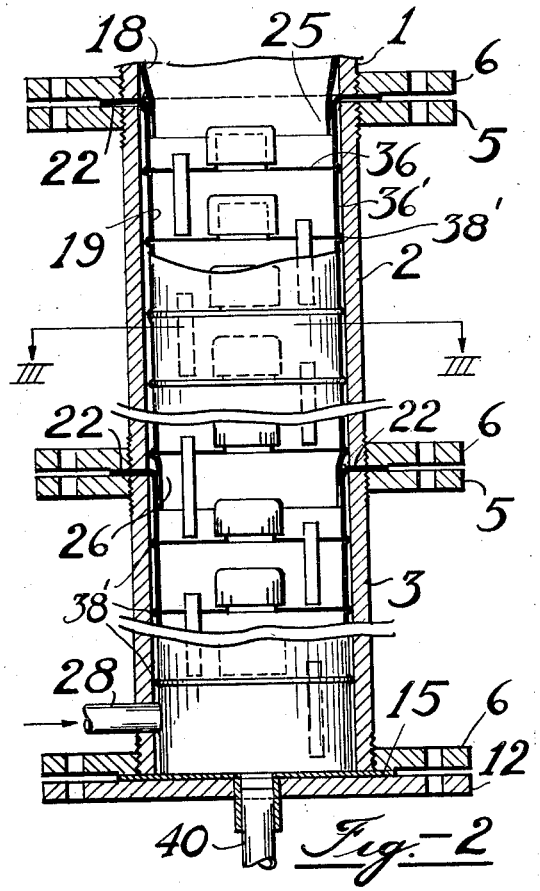
Fig. 2 is a detail longitudinal sectional view through the column.
Figure 3:
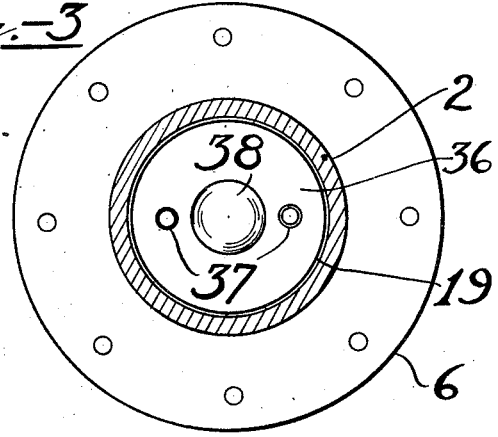
Fig. 3 is a transverse sectional view taken along the line III—III of Fig. 2.

Referring particularly to the drawing, a fractionating column is shown comprising a shell formed of a plurality of sections 1, 2 and 3 of pipe. The exterior surfaces of the opposite ends of each pipe section are provided with screw threads. Annular rings 5 and 6 are threaded upon the upper and lower ends of the pipe sections respectively to form substantially radially outwardly extending flanges or shoulders. The flanges 5 and 6 are secured together by suitable bolts 9 or the like uniting the pipe sections into a continuous shell. Suitable closures are provided for the ends of the shell by means of plates 11 and 12 which are secured to end flanges 5 and 6 respectively by means of bolts 14 or the like. A suitable gasket 15 may be interposed between the plates 11 and 12 and the adjoining ends of the pipe.

A sectional liner is disposed within the interior of the shell. The liner includes tubes 18, 19 and 20 which are disposed within the pipe sections 1, 2 and 3 respectively. The tubular linings 19 and 20 are each provided with a substantially radially outwardly extending annular lip or rib 22 at their upper end. The annular lip or rib 22 extends between the ends of the adjoining pipe sections. The flanges 22 function to seal the joints between adjoining pipe sections to maintain the joints fluid tight. The flanges 22 function as a support for the liner sections. The upper liner section 18 is provided with a substantially radially outwardly extending flange 23 which is positioned between the gasket 15 and the adjoining end of the pipe section 1. The lower end portions 25 and 26 of liner sections 18 and 19 are tapered inwardly and overlap the upper ends of liner sections 19 and 20 respectively to form a downwardly facing joint between the liner sections. The liner sections are preferably formed of non-corrosive sheet metal thereby preventing circulation of vapors exteriorly of the liner sections beyond the joints.

The fractionating column is provided with an inlet pipe 28 which opens through pipe section 3 and liner section 20 for introduction of materials to be fractionated. The fractionating column is provided with a discharge line 29 which leads from the top plate 11 and is adapted to conduct the uncondensed vapors from the column. A suitable condenser coil 30 is provided in the upper portion of the column which functions to condense portions of the vapors to form a reflux liquid. The condenser coil is provided with a suitable inlet 31 and outlet 32 which pass through the top plate 11.

In the preferred embodiment of the invention, the liner sections 19 and 20 are each formed of annular rings 36' which are welded to plates 36 at 38'. The plates 36 carry over-flow line 37 and bell caps 38. While the liner sections 19 and 20 have been described as formed of a plurality of rings, it will be understood that the liner sections can each be constructed as a single tube to which the plates 36 are secured and some of the advantages of the invention will be retained. A draw-off line 40 leads from the bottom plate 12 of the column. Each liner section may be provided with a hook suitably attached as to the top plate 36 to facilitate withdrawing the sections from the pipe.

The construction of fractionating column described results in ease of construction, low cost of manufacture, ease of replacement and ease in cleaning. While the invention has been described as applied to a fractionating column, it will be understood that other equipment such as scrubbers, absorbers or the like which may contain bubble cap plates may be provided with the features of the invention.

Various changes may be made within the scope of the appended claims in which it is desired to claim all novelty inherent in the invention as broadly as the prior art permits.

I claim:

1. In a fractionating column, a shell comprising a pipe formed of sections each having exteriorly threaded ends, flanges threaded to the ends, means securing the flanges together to form a continuous pipe, flanges threaded to the ends of the continuous pipe, a plate closing the ends and secured to the flanges, and a tubular sheet metal lining formed of overlapping sections having outwardly faced flanges extending between the pipe sections.

2. In a fractionating column, a shell comprising a pipe formed of sections, a closure for each end of the pipe, a removable liner for the interior of each pipe section, the lower end of each section of liner overlapping the upper end of the adjoining section, sealing each section of the liner to the next and preventing vapors from circulating between the liner and the shell.

3. In combination with a distillation or treating tower, a fabricated liner section comprising an upper annular portion having an outwardly faced flange at its upper end, a lower annular portion tapered inwardly at its lower end, and one or more intermediate annular portions separated from the upper and lower portions and from each other by plates extending transversely to said annular portions, the plates and annular portions being secured together to form a unitary structure.

4. In combination with a distillation or treating tower, a plurality of tubular, sheet metal liner sections, each section having an outwardly faced flange at its upper end and an inwardly tapered portion at its lower end, said liner sections being removably suspended within the tower in fluid and vapor tight relationship to one another.

PETER J. WIEZEVICH.